Jan. 28, 1941.  G. L. WINDER  2,230,151
METHOD OF MAKING DISTENSIBLE BAG CATHETERS
Original Filed Oct. 13, 1937
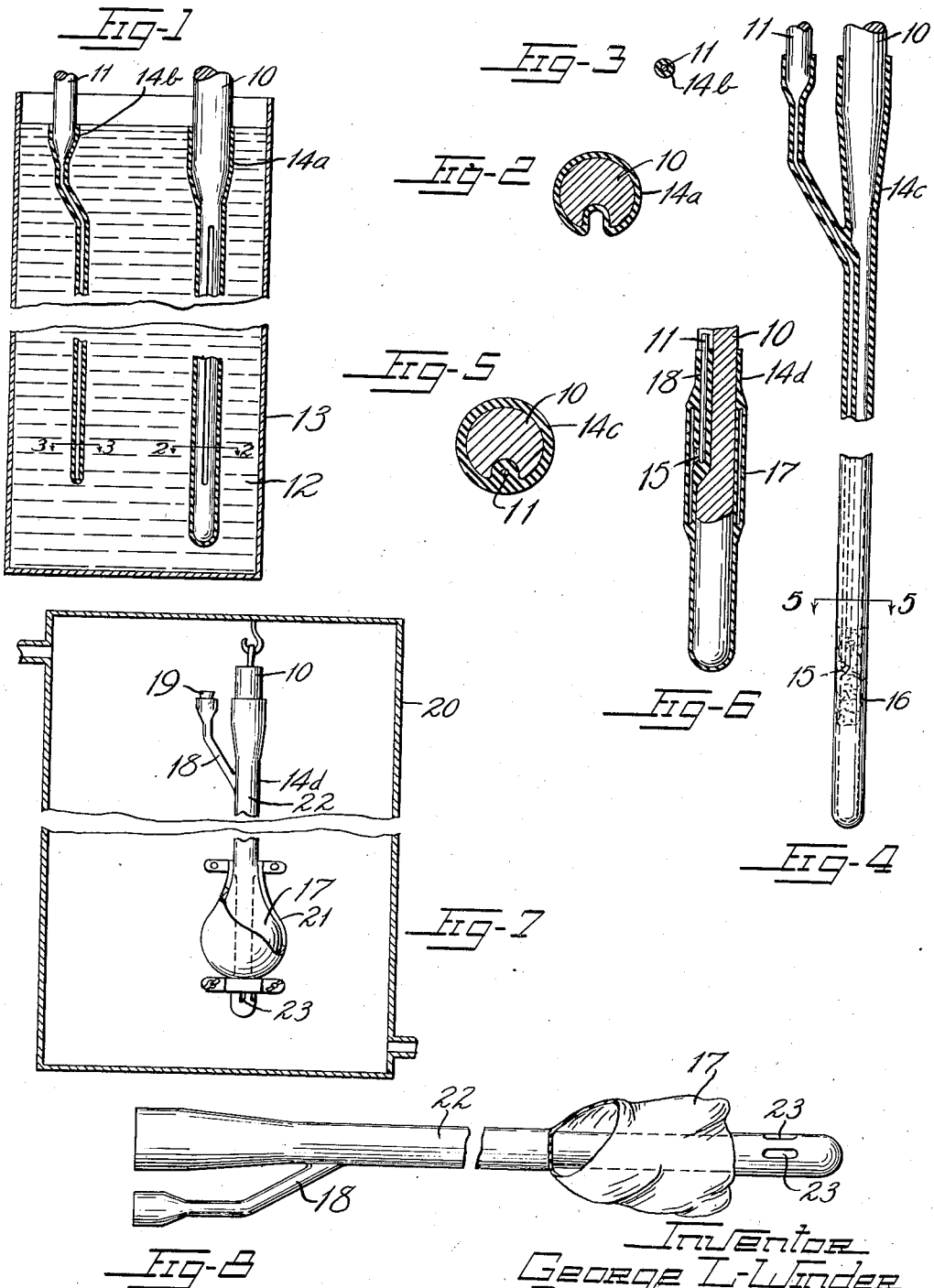
Inventor
George L. Winder Patented Jan. 28, 1941

2,230,151

UNITED STATES PATENT OFFICE 2,230,151

METHOD OF MAKING DISTENSIBLE BAG CATHETERS

George L. Winder, Cuyahoga Falls, Ohio, assignor to American Anode Inc., Akron, Ohio, a corporation of Delaware Original application October 13, 1937, Serial No. 168,756. Divided and this application August 9, 1939, Serial No. 289,243

5 Claims. (Cl. 18—58)

This invention relates to rubber surgical accessories and especially to catheters provided with distensible bags of the type designed for use in controlling hemorrhage following trans-urethral resection of the prostate gland, and for analogous purposes, and to methods of manufacturing such surgical accessories.

This application is a division of my co-pending application, Serial No. 168,756, filed October 13, 1937.

There is now available upon the market a distensible bag catheter known as the "Foley" catheter which consists of a principal drainage tube provided with a circumferential bag portion proximal to the drainage eyelets, and having an independent distension duct extending longitudinally through the body of the drainage tube to the bag for injecting fluid to distend the bag after the catheter is in place. Such catheters have been made by depositing rubber from a liquid rubber composition upon suitable forms to produce the double-channeled body of the catheter, then treating a local circumferential zone of the body where the distensible bag is desired with a separating material or a chemical adapted to prevent adhesion of a subsequently applied coating of rubber to the body of the catheter, and then applying such a coating of rubber to form the distensible bag portion in situ and integral with the main body of the catheter. The bag portion of such a catheter, however, is not in fact a bag but is merely a close-fitting annular band of rubber which is attached at both edges to the body of the catheter, and when such a close-fitting bag portion is distended to the bulbous configuration required in use, the rubber of the bag is necessarily greatly stretched. This is undesirable for several reasons. Considerable pressure is required to distend such a bag and, upon distending, the rubber may not stretch uniformly throughout the bag which produces an improperly shaped distended bag. The walls of the distended bag are under relatively high tension and may therefore fail by bursting or puncture, with attendant danger to the patient. If there is any appreciable lamination in the body of the catheter, the pressure and tension may pull the rubber layer forming the bag loose from the underlying rubber at the edges of the bag which, of course, would result at least in an improperly shaped bag, and in many cases, would completely ruin the catheter for further use.

Many of these undesirable features may be eliminated by forming the bag as a separate part with a desired bulbous configuration and attaching the pre-formed bulbous bag to the body of a suitable double-channeled rubber catheter as described in my co-pending application Serial No. 163,422 filed September 11, 1937, but many surgeons prefer an integral bag formed in situ, feeling that an integral one-piece structure is less likely to fail in use.

The present invention accordingly has for its chief objects the provision of a catheter or similar surgical accessory provided with a distensible bag formed in situ but which is pre-distended so that minimum pressure and minimum stretching of the rubber will be required to fit the bag to the prostatic fossa of a patient, and the provision of an economical and efficient method of making such an article. More generally, the invention aims to provide economy and efficiency in rubber surgical accessories and in the manufacture of such accessories. Other objects will appear as the description of the invention proceeds with reference to the accompanying drawing of which:

Fig. 1 is a sectional elevation illustrating the initial step in a preferred process of manufacturing distensible bag catheters according to the present invention and showing complementary deposition forms immersed in a liquid rubber composition with coatings of rubber upon the forms.

Fig. 2 is a section taken on line 2—2 of Fig. 1.

Fig. 3 is a section taken on line 3—3 of Fig. 1.

Fig. 4 is an elevation showing the catheter at an intermediate stage of manufacture ready for application of the rubber coating which forms the bag portion.

Fig. 5 is a section taken on line 5—5 of Fig. 4.

Fig. 6 is a fragmentary elevation, partially broken away for clarity of illustration, showing the catheter after application of the bag-forming coat of rubber.

Fig. 7 is a sectional elevation illustrating later steps in the process and showing the preferred procedure of drying and vulcanizing the catheter while the bag is distended.

Fig. 8 is an elevation, partially broken away for clarity of illustration, showing a finished distensible bag catheter made in accordance with the present invention.

In manufacturing a distensible bag catheter according to a preferred procedure illustrative of the present invention, I utilize complementary deposition forms 10 and 11 for producing the double-channeled body of the catheter. The principal or drainage tube form 10 preferably should be a circular rod provided with a longitudinal groove, while the auxiliary or distension-duct form 11 should preferably be a wire or rod of relatively small diameter adapted to fit in the groove of the drainage tube form 10 and having an offset extension as shown.

In the process, the deposition forms 10 and 11 are individually coated with rubber, as by immersing the forms to a suitable depth in a liquid rubber composition 12 contained in a tank 13 and depositing coatings of rubber, designated 14a and 14b respectively, upon the forms 10 and 11. The liquid rubber composition 12 may be a solution of rubber in a suitable solvent such as the so-called rubber cements, or it may be a natural or artificial aqueous dispersion of rubber, and the deposition of the rubber coatings upon the forms may be effected in any well-known manner. Preferably, however, the liquid rubber composition 12 should be a concentrated natural latex suitably compounded with the usual vulcanizing and conditioning ingredients, and the deposition of the rubber should be effected by preliminarily coating the forms with a latex-coagulating composition as described in U. S. Patent No. 1,908,719, and, if necessary, with a pulverulent separating material such as soapstone as described in U. S. Patent No. 1,924,214, to facilitate stripping the deposited rubber from the forms.

When the rubber deposits 14a, 14h, have solidified sufficiently to permit handling, the coated forms 10, 11 are assembled by placing the coated auxiliary form 11 in the groove of the coated principal form 10 and pressing the fresh rubber deposits tightly together, cohesion of the unvulcanized rubber deposits usually being sufficient to hold the coated form in proper relation for further handling. The assembled coated forms are then immersed in the liquid rubber composition 12 and an additional overall coating of rubber is deposited upon the assembly, the additional deposit merging with the previous deposits to form an integral deposit designated 14c (Fig. 5).

After the deposit 14c has become firmly set, but before it is dried beyond the point at which satisfactory cohesion of a subsequently applied rubber deposit may be obtained, a small opening 15 is cut in the rubber overlying the auxiliary form 11 at a point near the distal end of the form, thereby providing communication into the distension duct produced in the body of the catheter by the form 11, and a circumferential zone 16 of the rubber deposit 14c, about one or two inches wide and including the opening 15, is treated to prevent cohesion of a subsequently applied rubber deposit with the deposit 14c. For example, the circumferential zone 16 may be treated with a suspension of a pulverulent separating material such as soapstone in alcohol, preferably containing a latex coagulant if latex is being used, or it may be treated with bromine or chlorine in a suitable solvent, or otherwise treated to render the local zone 16 of the rubber non-adhesive, such procedures being well-known. The prepared assembly (Fig. 4) is then again immersed in the liquid rubber composition 12 and an additional overall thin coating of rubber about 0.015 inch thick is produced upon the assembly, this coating merging with the former rubber deposits to produce an integral rubber structure 14d except over the treated zone where the final coating forms a separate circumferential band 17 constituting a distensible bag portion.

The product at this stage of manufacture is thoroughly washed for several hours in running water and then is allowed to stand for about an hour at room temperature to effect superficial drying of the rubber. The auxiliary form 11 is then removed from the rubber deposit, and a measured quantity of air is injected through the distension duct 18 produced by the form 11, as with a calibrated syringe, to distend the bag 17 to the desired extent approximating the maximum distension to be required of the bag in use, and the distension duct is then closed as by inserting a stopper 19 in the open end of the duct. For the usual size hemostatic bag catheter, 30 to 50 cc. of air ordinarily are injected. The catheter with the bag distended is then subjected to conventional drying and vulcanizing treatments (Fig. 7) as by hanging the catheter (while still on the principal form 10) in an oven 20 and circulating hot air at a temperature of 150° F. for eight hours and then raising the temperature to vulcanizing temperatures for an appropriate time to effect vulcanization of the rubber, these factors depending, of course, upon the particular rubber composition being used. If desired, the drying may be completed before the bag is distended, but it is preferred to effect substantially all the drying as well as the vulcanization of the rubber while the bag is distended.

Desirably, although not necessarily, a sheet metal mold 21 formed of separable halves may be clamped about the distended bag during drying and vulcanization of the rubber to insure production of a perfectly uniform shape and, if desired, to mold the bag to a desired shape different from the natural distended configuration of the bag. For example, the mold may have an unsymmetrical oblate spheroidal configuration, as illustrated in Fig. 7, to produce a bag having what is broadly termed in the art a "pear-shape" for more closely fitting the prostatic fossa.

The drying and vulcanizing of the distended rubber bag relieves the tension in the rubber and fixes the bag in its distended condition so that, when the bag is deflated, the rubber walls of the bag do not contract to their initial close-fitting extent but retain substantially their distended extent, the bag collapsing and forming folds as shown in Fig. 8 as a result of the increased extent of the walls.

Finally, the principal form 10 is withdrawn from the drainage tube 22 formed thereby, the ends of the tubes are trimmed, and drainage eyelets 23, 23 are cut in approximate positions distal to the bag 17, to produce the finished distensible bag catheter illustrated in Fig. 8.

It is therefore seen that the distensible bag catheter produced according to the present invention has an integral one-piece structure, the distensible bag being formed in situ and the walls of the bag being an integral continuation of outer portions of the main body of the catheter, but that the bag nevertheless has a pre-distended or pre-set configuration approximating the configuration ordinarily required in use so that minimum stretching of the rubber bag accompanies its distension, thereby reducing the pressure required for distension, eliminating the high strains in previous distended bags, and minimizing the danger of failure. Also the present invention provides, for the first time, an integral bag formed in situ and having the highly desirable "pear-shape" for fitting the prostatic fossa. The bag walls retain their flexibility, however, and the bag may be caused to conform to cavities of various shapes. Also, the bag may be distended to sizes larger than the pre-distended or pre-set size, by injecting fluid under sufficient pressure to stretch the bag, and upon deflation, in such case, the bag will again assume substantially the pre-set size and shape.

Numerous modifications and variations in details of the procedure and materials as herein described may be effected without departing from the spirit and scope of the invention as defined by the appended claims.

I claim:

1. The method of making a distensible bag catheter or similar article, which comprises depositing rubber from a liquid rubber composition upon complementary deposition forms to produce a tubular rubber structure having at least two channels, providing an opening in the wall of said structure leading into one of said channels, treating a local zone about said opening to prevent cohesion of a subsequently applied deposit of rubber with the tubular rubber structure, superposing a rubber deposit from a liquid rubber composition over the treated zone and adjacent area to form a distensible bag, distending the bag, and subjecting the rubber to finishing treatment for fixing the bag walls in their distended conditions.

2. A method as defined by claim 1 in which the distended bag is enclosed in a mold during the finishing treatment.

3. A method as defined by claim 1 in which the finishing treatment comprises vulcanizing the rubber.

4. A method as defined by claim 1 in which the finishing treatment comprises drying and vulcanizing the rubber.

5. The method of making a rubber article including a tubular body and a distensible bag thereon, which comprises depositing rubber from a liquid rubber composition to produce a tubular rubber structure having at least one channel therein, providing an opening in the wall of said tubular structure leading into said channel, providing a bag of extensible rubber material about the tubular structure and over said opening, distending the bag to a substantial extent, and, while the bag is in a distended condition, subjecting the rubber material of the bag to a finishing treatment for fixing the bag substantially in its distended condition.

GEORGE L. WINDER.

CERTIFICATE OF CORRECTION.

Patent No. 2,230.151.　　　　　　　　　　　　　　　　January 28, 1941.

GEORGE L. WINDER.

It is hereby certified that error appears in the printed specification of the above numbered patent requiring correction as follows: Page 2, first column, line 28, for "14h" read --14b--; line 35, for the word "form" read --forms--: and second column, line 52, for the word "approximate" read --appropriate--; and that the said Letters Patent should be read with this correction therein that the same may conform to the record of the case in the Patent Office.

Signed and sealed this 29th day of September, A. D. 1942.

(Seal)　　　　　　　　　　　　　　　　　　　　　　　Henry Van Arsdale,
　　　　　　　　　　　　　　　　　　　　　　Acting Commissioner of Patents.